FIG.1a.

Aug. 9, 1938.  R. A. ROWLEY  2,126,666
MULTIPLYING MACHINE
Filed Nov. 14, 1935  7 Sheets-Sheet 3

FIG. 1c.

Aug. 9, 1938.  R. A. ROWLEY  2,126,666
MULTIPLYING MACHINE
Filed Nov. 14, 1935  7 Sheets-Sheet 5

INVENTOR
Russell A. Rowley
BY
ATTORNEY

Aug. 9, 1938.    R. A. ROWLEY    2,126,666
MULTIPLYING MACHINE
Filed Nov. 14, 1935    7 Sheets—Sheet 6

INVENTOR
Russell A. Rowley
BY
ATTORNEY

Aug. 9, 1938.    R. A. ROWLEY    2,126,666
MULTIPLYING MACHINE
Filed Nov. 14, 1935    7 Sheets-Sheet 7

FIG. 9.

INVENTOR
Russell A. Rowley
BY
ATTORNEY

Patented Aug. 9, 1938

2,126,666

UNITED STATES PATENT OFFICE 2,126,666

MULTIPLYING MACHINE

Russell A. Rowley, Endicott, N. Y., assignor to International Business Machines Corporation, New York, N. Y., a corporation of New York Application November 14, 1935, Serial No. 49,671

8 Claims. (Cl. 235—61.10)

This invention relates to improvements in multiplying machines and more specifically to machines of the record card controlled type.

The principal object of the invention is to provide improvements in such machines whereby certain problems may be more expeditiously solved.

A further object of the invention is to provide means for determining the arithmetical sign of a product in accordance with the arithmetical signs of its factors.

More specifically an object of the invention is to sense perforations in a record card for factors and for designations representing the arithmetical sign of the factors and to indicate by a special designation in another field of the card the arithmetical sign of the product.

A more specific object of the invention is to provide improved means for evaluating the equation $B \pm CD$ and to record the result back in the record card as a true number.

Various other objects and advantages of the invention will be obvious from the following particular description of one form of mechanism embodying the invention or from an inspection of the accompanying drawings; and the invention also constitutes certain new and useful features of construction and combination of parts hereinafter set forth and claimed.

*Standard operation*

Before explaining the improvements of the invention, a brief explanation will be given of the manner in which the machine operates in performing simple multiplying operations, that is, the multiplication of two factors and the perforating of the product back on the record card. The mechanical structure of the machine is substantially the same as that of Patent No. 1,933,-714, granted November 7, 1933 to J. M. Cunningham, and of Patent No. 1,944,665, granted January 23, 1934 to D. J. Oldenboom.

Figure 1A:
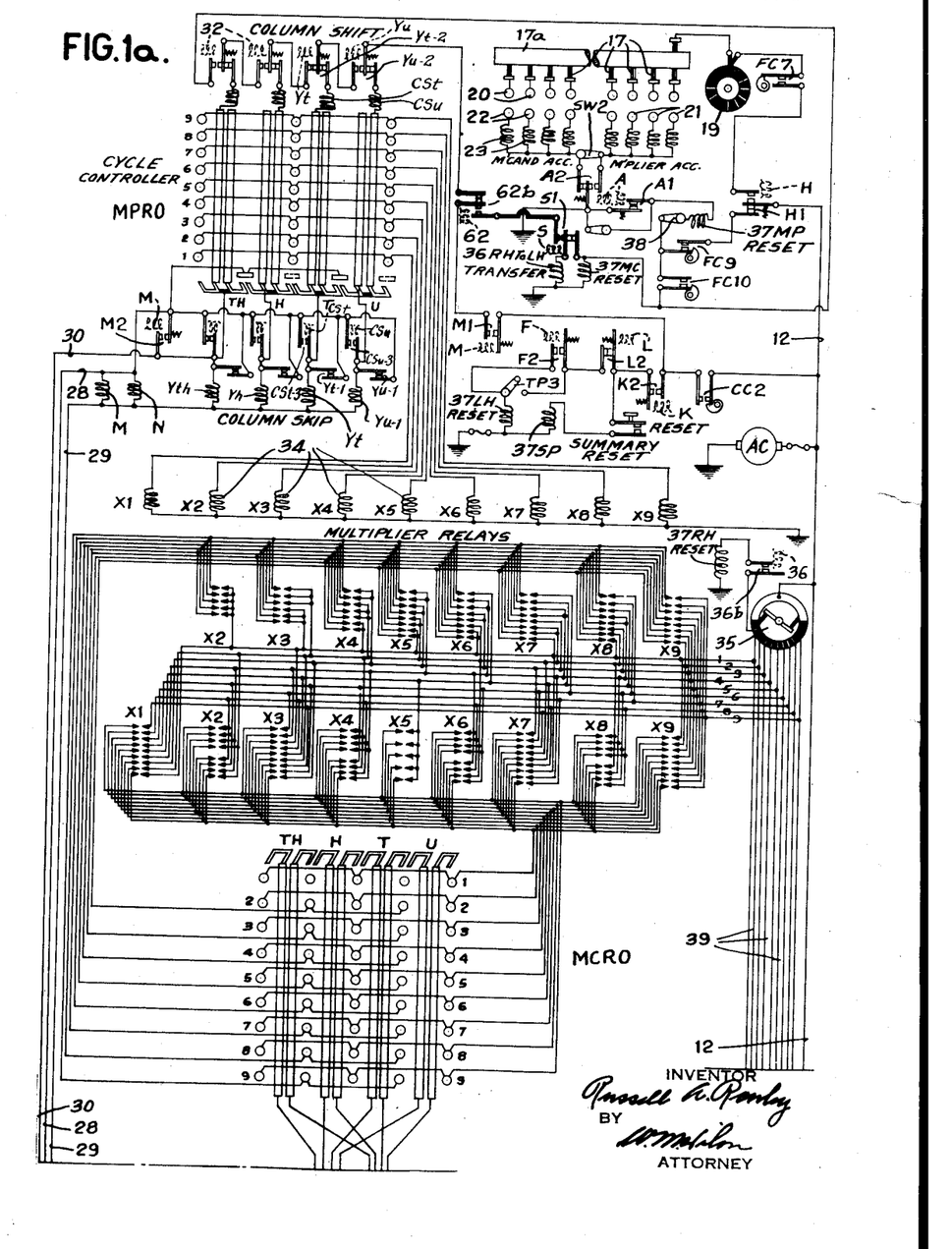
Figs. 1a, 1b, and 1c, taken together and placed one above the other in the order named, constitute a wiring diagram of the electric circuits of the machine.
Figure 1B:
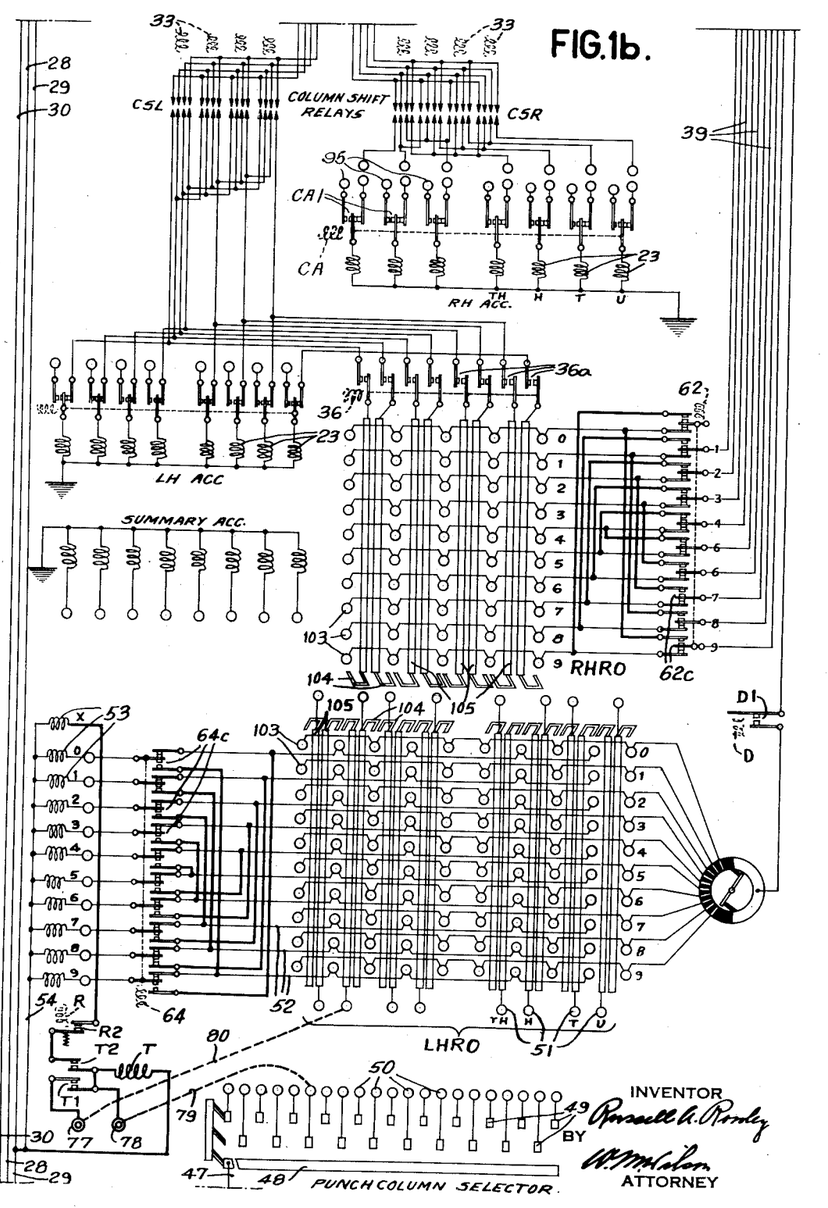
Figure 1C:
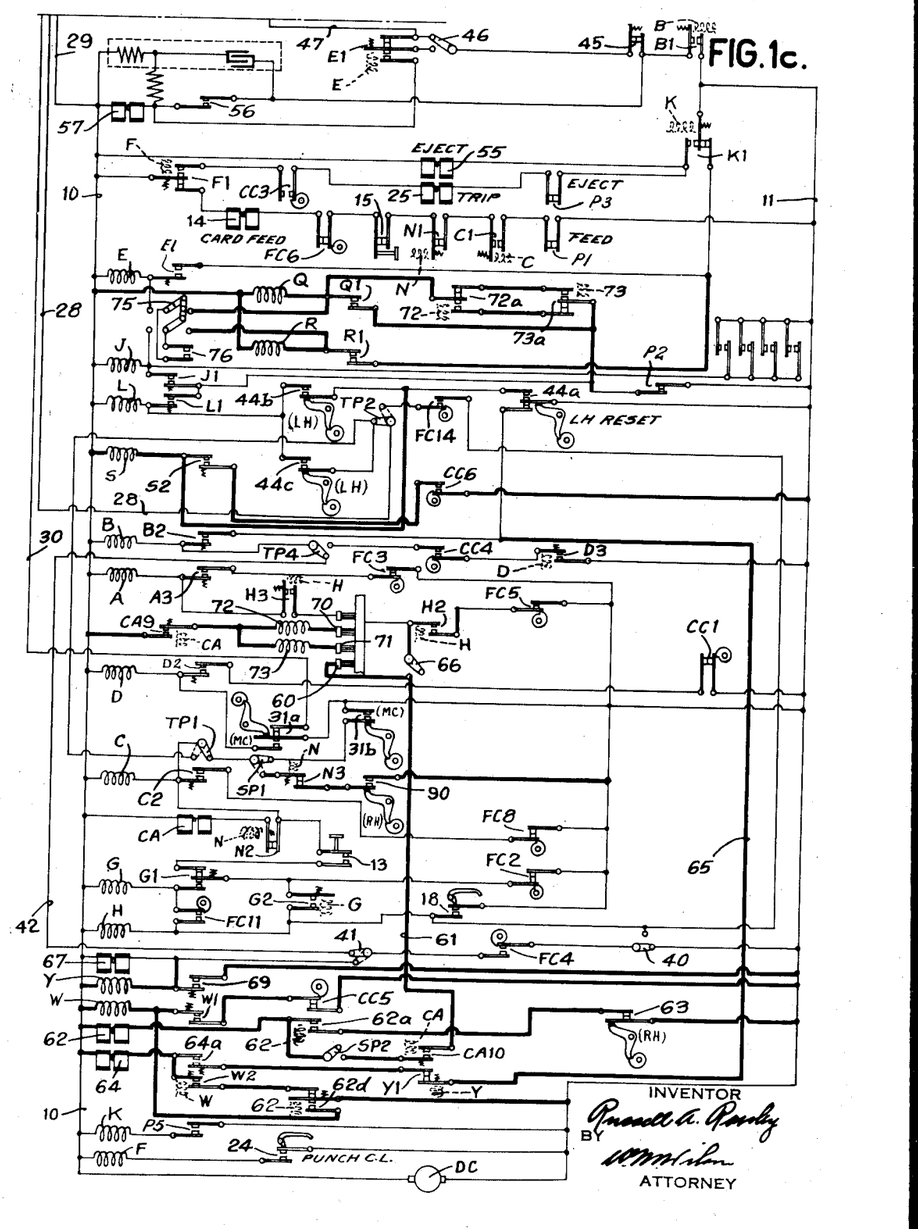

In the circuit diagram, Figs. 1a, 1b, and 1c, the circuits and electrical devices which have been added to the wiring arrangement of a standard commercial multiplying machine are emphasized by heavy lines to more clearly indicate the manner in which the improvements have been incorporated in such machine.

After record cards bearing perforations representative of the factors to be multiplied have been placed in the feed magazine of the machine and after the various preliminary plug connections have been made for directing the entries into the accumulators, the main line switch (not shown) is closed to place the machine in operation during which the section of the generator designated DC (Fig. 1c) supplies current to DC lines 10 and 11 and a section designated AC (Fig. 1a) supplies current to ground and to a line 12. The start key contacts 13 (Fig. 1c) are now closed by depression of the start key button, which completes the circuit from the DC line 10, through a relay coil C, contacts 13 now closed, upper contacts G1, cam contacts FC2, to line 11. The coil C establishes a holding circuit through its contacts C2 and the cam contacts FC8.

The coil C, when energized, also closes a pair of contacts C1, shown in the upper part of Fig. 1c, which will complete a circuit from line 10, normally closed relay contacts F1, card feed clutch magnet 14, cam contacts FC6, stop key contacts 15, relay contacts N1, contacts C1, a pair of contacts P1, to line 11. Energization of card feed clutch magnet 14 will cause withdrawal of a card from the magazine 100 (see Fig. 3) and will advance it to the analyzing brushes 17. In transit to the brushes 17, the card first passes a pre-sensing station, generally designated 101. During this movement of the card, the usual card lever is engaged to close card lever contacts 18 (Fig. 1c) which complete a circuit from line 11, contacts 18, relay magnet H, to line 10.

In starting up the machine, it is necessary to hold down the start key to maintain the contacts 13 closed during the first complete card feeding cycle, or, alternatively, to depress the start key a second time. At the beginning of the second cycle, the closure of cam contacts FC11 will energize relay magnet G through a circuit including card lever contacts 18. Relay magnet G will close its normally open contacts G1, setting up a holding circuit through cam contacts FC2, and will also close relay contacts G2 to provide a further holding circuit through the card lever contacts 18. These two holding circuits alternate in maintaining relay magnet G energized as long as cards continue to feed from the magazine 100. The relay magnet H is also provided with a holding circuit, which extends through card lever contacts 18, or serially through relay contacts G2 and cam contacts FC2.

Energization of relay magnet H will cause shifting of its contacts H1 (Fig. 1a) to the reverse of the position shown, thereby supplying current to the distributor 19 which supplies current to the contact roll 17a of the analyzing brushes 17. As the card proceeds to pass the analyzing brushes, circuits will be completed to the accumulators selected to receive entries in accordance with the perforations in the record card; that is, as the card traverses the brushes 17, the multiplier factor will be entered into the multiplier accumulator and the multiplicand factor will be entered into the multiplicand accumulator.

The entering circuits extend from the AC generator through line 12 to the now closed contacts H1, cam contacts FC7, distributor 19, brush contact roll 17a between which and the brushes 17 the card passes. From the contact roll, the circuits extend through the perforations in the card, the brushes 17, to plug sockets 20, from which suitable plug connections are made to sockets 21 and sockets 22 of the multiplier and multiplicand accumulators respectively, to effect energization of the adding magnets 23 of the related accumulators. The entering circuit, after passing through the magnets 23, continues through normally closed contacts A2 to ground.

Figure 2:
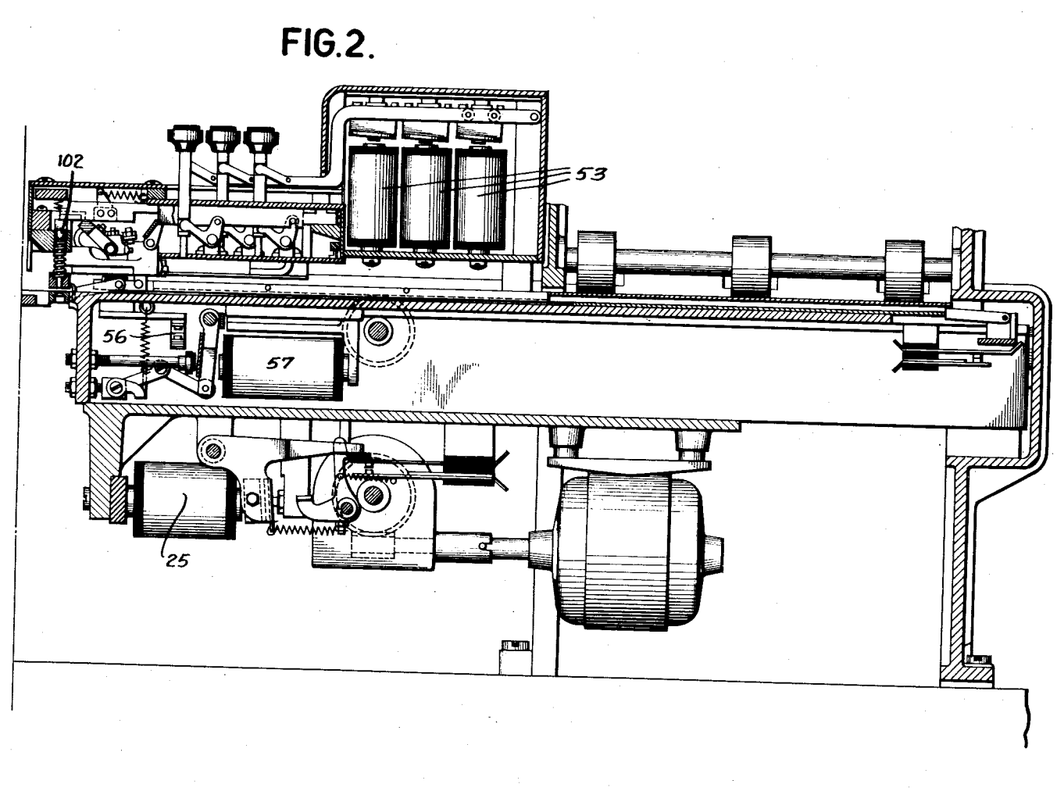
Fig. 2 is a cross sectional view of the punching mechanism of the machine.

After the first card has traversed the brushes 17, it is fed into the punching unit of the machine and upon its arrival there, it causes closure of punch card lever contacts 24 (see Fig. 3 and bottom of Fig. 1c) which cause energization of the relay magnet F. The closure of the normally open contacts F1 (upper part of Fig. 1c), establishes a circuit from line 10, now closed contacts F1, cam contacts CC3, trip magnet 25 of the punching mechanism (see Fig. 2) which functions to trip clutch mechanism to further advance the card to punching position. The circuit continues through eject contacts P3 and relay contacts K1 which at this time are in a position reverse to that shown. The contacts K1 are controlled by relay magnet K which is energized through last column contacts P5 in the punching unit. These contacts P5 are closed whenever the card advancing carriage of the punching unit is in last column position, which position it occupies when the operation of the entire machine is first started, so that upon starting, relay K is energized and its contacts K1 are in shifted position.

The cards are handled in the card punching unit in the customary manner as set forth in the above mentioned patents. After the analyzed card has been advanced column by column past the line of punches 102, and the left hand component accumulator LH is being reset, a circuit is completed which extends from line 11 (Fig. 1c), contacts 44a, 44b, and 44c (which are closed while the LH accumulator is resetting), switch TP2, wire 28 (Figs. 1b and 1a), through relay magnets M and N in parallel, wire 29 (Figs. 1b and 1c) to line 10. Relay magnet M closes its contacts M2 (Fig. 1a) to provide a holding circuit for the relays extending from line 10, wire 29, relays M and N, contacts M2, wire 30, to the normally closed contacts 31a (Fig. 1c) and line 11. Contacts 31a are opened during the operation wherein the MC accumulator is reset and until such time, relay magnets M and N will remain energized. These are the master relay magnets of the cycle controller unit and they call the cycle controller into operation to determine the location of significant figures in the multiplier. The circuit through wire 28 also extends to the zero segments of the readout unit of the multiplier accumulator designated MPRO. If any of the brushes of the MPRO stand at zero, selected ones of the column skip magnets Yu, Yt, etc. will be energized according to which denominational orders of the multiplier contain zeros. The magnets Yu, Yt, etc. control contacts Yu—2, Yt—2, etc. through which circuits are completed to the column shift relay magnets CSu, CSt, etc., and to the multiplying relay magnets 34.

In those positions in which the multiplier digit is zero, the associated magnet Yu, Yt, etc. will be energized and the related contacts Yu—2, Yt—2, etc. will be shifted from the position shown in the diagram so that the related magnet CSu, CSt, etc. will be disconnected from the circuit which is traceable from line 12, cam contacts CC2, relay contacts M1, normally closed contacts Yu—2, relay magnet CSu, through the appropriate readout spot in one order of the readout section MPRO, to the corresponding readout magnet 34, and thence to ground. The function of the contacts Yu—2, Yt—2, etc. is to direct the multiplying relay selecting circuits through only those positions in which significant figures occur in the multiplier and to skip the positions in which zeros occur.

With a particular magnet 34 energized, for example the X5 magnet 34, the related contacts shown in the center of Fig. 1a, will become closed and with the emitter 35 in constant operation, impulses will be emitted through the contacts of the times 5 multiplier relay 34 and thence through the readout device of the multiplicand accumulator designated MCRO, and thereafter, through the column shift relay contacts CSL and CSR (Fig. 1b) to the adding magnets 23 of the RH and LH accumulators which thus receive the right and left hand partial product entries respectively. The CSL and CSR relay contacts are controlled by the relay magnets CSu, CSt, etc. and serve to effect the proper denominational allocation of the partial product entries. Thus, when multiplying is being effected by the units digit of the multiplier, the units magnet CSu is energized and the units order sets of contacts CSL and CSR are closed.

Energization of a relay magnet CSu, CSt, etc. (Fig. 1a) will also close a pair of contacts CSu—3, CSt—3, etc. which will cause energization of the relay magnet Yu, Yt, etc. in the order in which multiplying is taking place. This, in turn, will shift the related pair of contacts Yu—2, Yt—2, etc. so that when cam contacts CC2 again close, the aforetraced circuit will be directed through the magnet CSu, CSt, etc. in the order containing the next higher significant figure and will skip the magnets CS$u$, CS$t$, etc. in positions in which zeros are present.

The machine continues multiplying operations during which the partial products are entered in succession into the LH and RH accumulators. After a multiplying cycle has been effected for each significant multiplier digit, all of the magnets Y$u$, Y$t$, etc. will have been energized and all of the contacts Y$u$—2, Y$t$—2, etc. will be in their shifted position so that on the next following cycle the closure of cam contacts CC2 will complete the circuit which extends through all of the now closed contacts Y$u$—2, Y$t$—2, etc. to the relay magnet 36 and the multiplicand reset magnet 37MC. A parallel circuit also extends through cam contacts MC10 and multiplier reset magnet 37MP.

If switch 38 is open, the multiplier accumulator will not be reset and the factor therein will become a socalled "fixed" multiplier for succeeding multiplying operations. The relay magnet 36 closes its contacts 36$a$ (Fig. 1$b$) which connect the readout section of the RH accumulator designated RHRO, to the adding magnets 23 of the LH accumulator, thus directing the sum of the right hand partial products into the LH accumulator to produce the complete product. These circuits are controlled from the emitter 35 (Fig. 1$a$) through a group of wires generally designated 39, which extend to the readout device RHRO.

Figure 5:
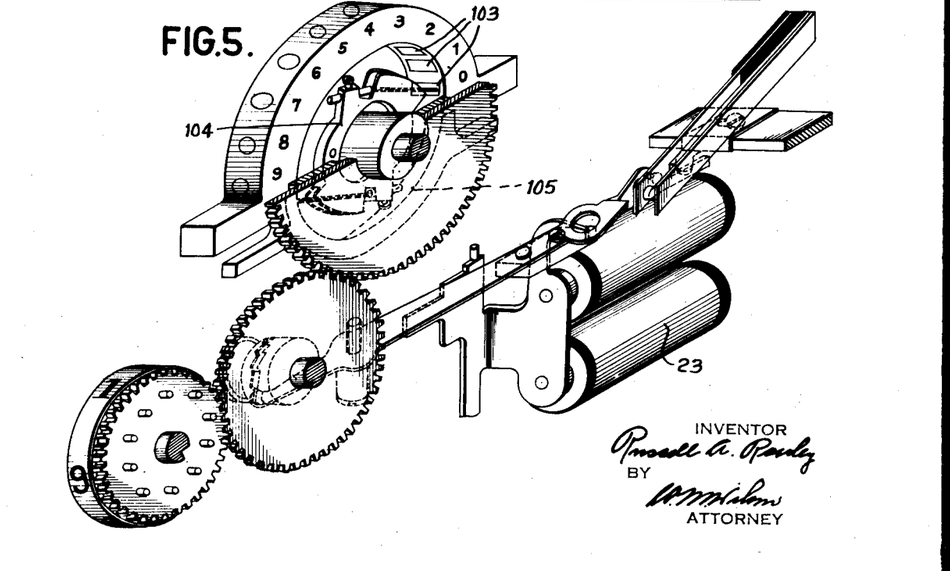
Fig. 5 is a detail in isometric of an order of one of the accumulators.

In Fig. 5 is shown a section of an accumulator to illustrate the mechanical arrangement of the readout section which is the same for all the accumulators. For each order there are commutator segments 103 which are electrically connected through the brush structure 104 to the common arcuate conducting strip 105. The position of the brush corresponds to the value entered on its associated accumulating wheel and connects the segment 103 having such value to the strip 105. In the circuit diagram the segments and strips are represented as circles and vertical bars, respectively.

During the cycle in which the MC accumulator is reset concurrently with the RH to LH transfer operation, the normally closed contacts 31$a$ (Fig. 1$c$) which are operated by a cam on the MC reset shaft will open to interrupt the circuit to the cycle controlling relay magnets Y$u$, Y$t$, etc., thus causing deenergization of all these magnets and the interruption of their related circuits. The RH to LH transfer relay magnet 36 closes a pair of contacts 36$b$ (Fig. 1$a$) through which a circuit is completed by the emitter 35 after the amount in the RH accumulator has been transferred to the LH accumulator. This circuit is traceable from line 12, through emitter 35, which, when the brushes thereof are at the zero segment, will continue through contacts 36$b$ to the reset magnet 37RH which functions to initiate resetting of this accumulator.

Referring now to Fig. 1$c$, the contacts 31$b$ are closed along with the shifting of contacts 31$a$ when the MC accumulator is resetting, thereby completing a circuit from line 11, contacts 31$b$, switches SP1 and TP1, relay magnet C, to line 10. Relay magnet C establishes a holding circuit through contacts C2 as before and also closes contacts C1 to complete the circuit through the card feed clutch magnet 14 as traced above. This causes the next card to be fed to the analyzing brushes 17 where the new factors will be entered into the accumulators and in the case of "fixed" multiplier operation wherein the multiplier accumulator is not reset, only a multiplicand factor will be entered into the MC accumulator in preparation for the next series of multiplying operations.

During the operation of card feeding, the cam contacts FC4 close, completing a circuit from line 11, switch 40, cam contacts FC4, switch 41, wire 42, switch TP4, relay B, to line 10. Energization of magnet B will close its contacts B2 to provide a holding circuit through normally closed contacts 44$a$ associated with the reset devices of the LH accumulator. The magnet B will also close its contacts B1, thereby establishing a circuit from line 11, contacts B1, contacts 45 in the punching unit, switch 46, wire 47 (Fig. 1$b$) to the common conducting strip 48 of the punch column selector.

The strip 48 is connected in succession to the segments 49 as the record card moves step by step past the column of punches 102 in the punching unit and, in those columns that are plug connected to the readout device LHRO, will complete circuits from segments 49 to sockets 51 and through the LHRO device to wires 52 which extend to the punch selecting magnets 53 (see also Fig. 2) whose common return wire 54 extends to line 10. While the step-by-step punching of the product takes place in the card, the new factors are entered into their appropriate accumulators and when the card is completely punched and advanced to its last column position, relay magnet K will be energized as before to close its normally open contacts K1 and complete a circuit through the eject magnet 55 (Fig. 1$c$) which ejects the punched record from the machine.

As explained in the above mentioned patents, the energization of any of the magnets 53 will advance a related interposer into operative relationship with a corresponding punch 102 and the advancement of any interposer will cause closure of a pair of contacts 56 which complete a circuit from line 10, through the punch magnet 57, contacts 56 and B1, to line 11. The punch magnet serves to press the selecter interposer against the punch to effect a perforation in the corresponding position in the card column. The feeding of a new card to the brushes will again cause closure of card lever contacts 18, causing energization of magnet H to permit the impulse distributor 19 to supply current to the card analyzing brushes 17.

Figure 6:
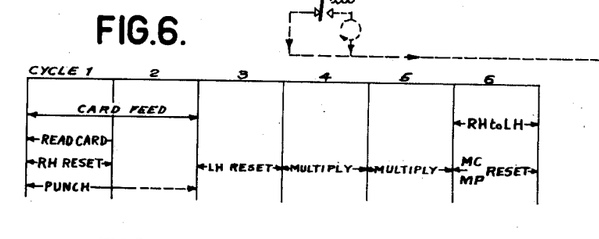
Fig. 6 is a diagram showing the sequence of cycles for simple multiplying and for the solution of the equation $B+CD$.

The operation of the machine as thus far described is substantially the manner in which multiplying operations are performed in the patents referred to and in commercial machines. In Fig. 6 is indicated the sequence of cycles where the multiplier factor contains two significant figures, resulting in two multiplying cycles. Where the machine handles the equation $B+CD$, the B field of the card is connected to the RH accumulator and the B amount is entered therein at the same time that the C and D factors are entered into their respective accumulators. During the ensuing multiplying cycles, the several partial products are also entered into the RH accumulator so that upon completion of multiplying the RH accumulator will contain the sum B plus the right hand partial products, which, when transferred to the LH accumulator, will result in the sum $B+CD$.

Figure 7:
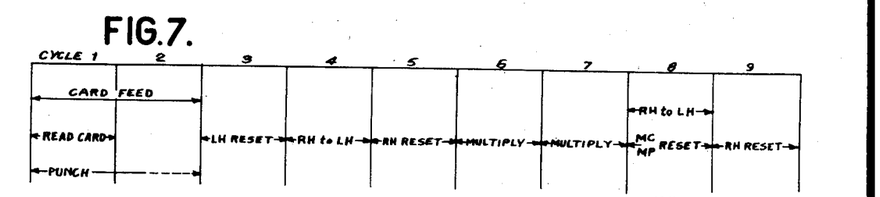
Fig. 7 is a similar diagram showing the order of cycles for handling the equation $B-CD$.
Figure 8:
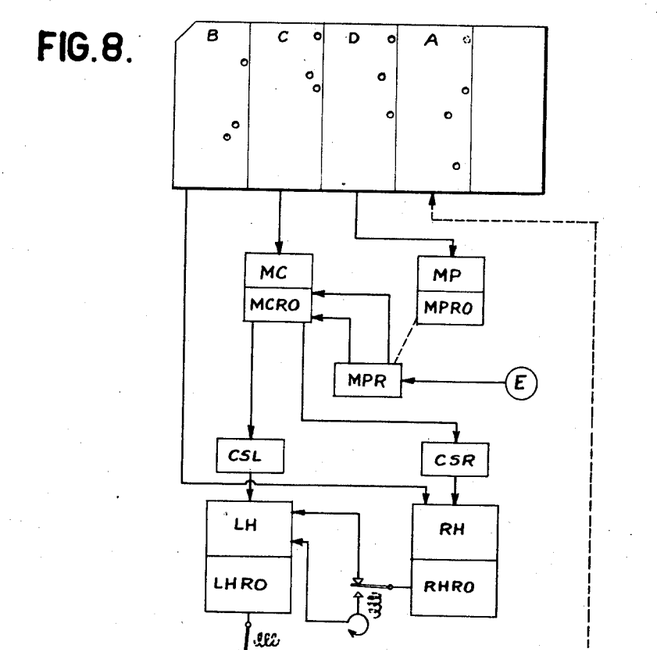
Fig. 8 is a diagrammatic representation of the various units of the machine, showing the manner in which they are interconnected for the computation of the equation $B \pm CD$.
Figure 9:
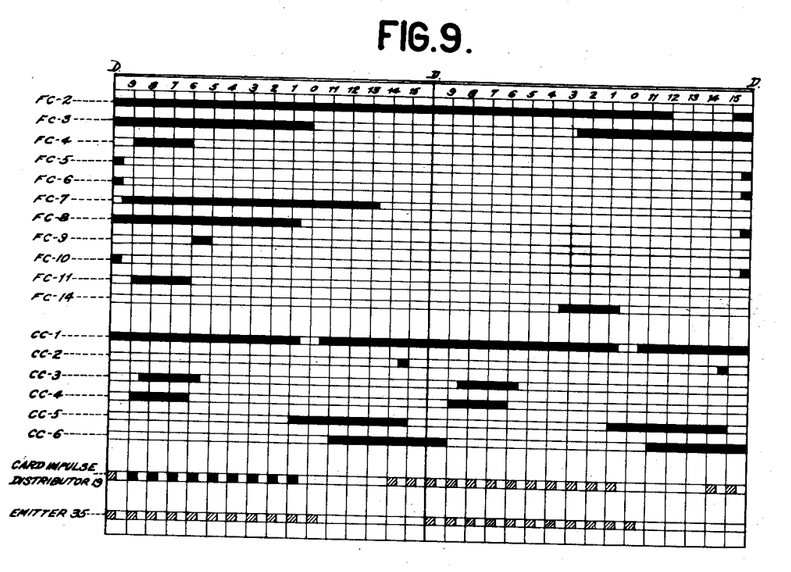
Fig. 9 is a timing diagram of the cam controlled contacts.

In Fig. 7 is shown diagrammatically the sequence of cycles which the machine will perform when the equation is $B-CD$. The difference in operation between that indicated in Fig. 6 and that in Fig. 7 lies in the interposition between the LH reset cycle and the multiplying cycles of two cycles, one an RH to LH transfer cycle, and the second an RH reset cycle. The record card will determine whether the machine will operate in accordance with the cycle arrangement of Fig. 6 or of Fig. 7, and this is done accordingly as it is determined that the card contains the equation $B+CD$ or $B-CD$. In Fig. 8 there is diagrammatically represented the general arrangement of connections whereby the C amount is entered into the MC accumulator, the D amount into the MP accumulator, and the B amount into the RH accumulator. The B amount is then transferred to the LH accumulator in the form of a nines complement and the RH accumulator is then reset.

Normal multiplying operations then take place during which the left hand partial products are added to the complement of B standing in the LH accumulator, and the RH partial products are accumulated in the RH accumulator. At the completion of multiplying, the normal RH to LH transfer takes place and the amount standing in LH will be either a complement or a true number. If B is greater than CD, the amount will be a complement, while if B is less than CD, the amount will be a true number. The highest order of the LH accumulator is tested to sense whether the number is true or complementary and the punch connections are inverted to cause punching in true number form. The problem $C-CD=A$ is carried out, as indicated diagrammatically in the following, where B has a value of 650, C 12 and D 14:

*Example I*

| Accum. | LH | RH | MC | MP |
|---|---|---|---|---|
| Entering cycle | | 650 | 12 | 14 |
| LH reset cycle | | | | |
| RH to LH cycle | 999349 | | | |
| RH reset cycle | | | | |
| Multiplying cycle | 4 | 8 | | |
| Do | 1 | 2 | | |
| RH to LH cycle | 28 | | Reset | Reset |
| Punch | 999517 000482 | | | |

As noted, the B amount is entered into the RH accumulator and transferred to the LH accumulator as a nines complement, after which the RH accumulator is cleared. The resulting amount, after the partial product is transferred from the RH accumulator, is 999517, which is a nines complement and by inverting the punch connections, the actual amount punched will be 482. Where CD is greater than B, for example where B is given the value 97, C 12, and D 14, the operation is diagrammatically as follows:

*Example II*

| Accum. | LH | RH | MC | MP |
|---|---|---|---|---|
| Entering cycle | | 97 | 12 | 14 |
| LH reset cycle | | | | |
| RH to LH cycle | 999902 | | | |
| RH reset cycle | | | | |
| Multiplying cycle | 4 | 8 | | |
| Do | 1 | 2 | | |
| RH to LH cycle | 28 | | | |
| Elusive one | 000070 1 | | | |
| Punch | 000071 | | | |

After the multiplying operations, the amount standing in LH is 70, which is one less than the correct answer. The elusive one is accordingly added and the true value 71 is directly punched.

The detailed manner in which these operations are carried out will now be explained. As the record card bearing the equation $B-CD$ passes the pre-sensing station 101, a special brush 60 (Fig. 1c) senses the column of the card for a perforation in the X position of a column and a circuit will be completed which is traceable from line 11, cam contacts FC5, relay contacts H2, whose controlling coil H is energized during the reading cycle, brush 60, wire 61, relay contacts CA10, closed at this time, a switch SP2, a magnet 62, to line 10. The contacts CA10 are controlled by the relay magnets CA which are connected in parallel with the relay magnets C in series with contacts N2. Since as explained above the control coil of N2 is not energized until the LH reset cycle, the magnet CA will be energized during the card reading cycle and its contacts CA10 closed during such time. The magnet CA also closes a group of contacts CA1 (Fig. 1b) which are interposed between the RH accumulator magnets 23 and plug sockets 95. If plug connections are made to these sockets from the sensing brushes which traverse the "B" field of the card, the amount sensed will be entered in the RH accumulator as contacts CA1 are closed during the card reading cycle. Magnet 62 closes a pair of contacts 62a providing a holding circuit through the RH reset contacts 63 which remain closed until the RH accumulator is reset. During the ensuing LH reset cycle, the upper contacts 44a close, completing a circuit from line 11, contacts 44a, relay magnet S, to line 10. The magnet S closes its contacts S2 to provide a holding circuit through the cam contacts CC6.

Referring now to Fig. 1a, a set of contacts S1 and a set of contacts 62b are arranged within the circuit as shown and with both magnets S and 62 energized, the multiplying initiating circuit will not go to the cycle controller but will follow the path traceable from line 12, cam contacts CC2, contacts M1, now closed contacts 62b, to now closed contacts S1, to the RH to LH transfer magnet 36 which will cause shifting of the contacts 36a (Fig. 1b). In this figure, contacts 62c controlled by the magnets 62 are inserted in the wires 39 leading from the emitter 35 to the RHRO device, and shifting of the contacts 62c will effect transposition of the connections so that the nine wire is connected to the zero segment, the eight wire to the one segment, and so on, and the amount transferred from the RH to LH accumulator will be the nines complement of the amount standing in the RHRO device. Since energization of magnet 36 also closes its contacts 36b, the relay magnet 37RH (Fig. 1a) will be energized to effect resetting of the RH accumulator following the transfer. During the resetting of the RH accumulator, the contacts 63 (Fig. 1c) are opened, deenergizing the magnet 62 and permitting the contacts 62b to return to normal position so that on the next following cycle, the circuit completed by contacts CC2 will call the first multiplying cycle into operation. From this point on, multiplying will take place as under standard conditions and the partial products gathered together in the LH accumulator which contains the previously entered complement.

In Fig. 1c are contacts 62d which are shifted when their controlling magnet 62 is energized. Upon such shifting, a circuit is completed from line 11, now closed contacts 62d, relay magnet W, to line 10. Magnet W closes its contact W1 to provide a holding circuit through cam contacts CC5. A second pair of contacts W2 is also closed and their closure maintained until the contacts 62d resume normal position, at which time, a circuit will be completed from line 11, normally closed contacts 62d, contacts W2, to magnet 64 and line 10. Magnet 64 closes a pair of contacts 64a to provide a holding circuit extending from contacts 64a to relay contacts Y1, wire 65, to normally closed contacts 44a and thence to line 11. This circuit, therefore, remains energized until the LH accumulator is reset, which, in accordance with Figs. 6 and 7, takes place after punching has been performed. The magnet 64 causes shifting of a group of contacts 64c (Fig. 1b). These contacts are inserted in the wires 52 in the same manner as the contacts 62c are inserted in the wire 39; that is, when shifted, they connect the positions of the LHRO to the corresponding nines complement magnets 53 so that a nine standing on an order of the accumulator will control the punching of a zero; an eight will control the punching of a one; and so on. The operation as thus far described is the manner in which the solution of Example I above is carried out.

Where it is known that all the cards are of the form B—CD and B is greater than CD in all cases, the sensing for an X perforation by the brush 60 may be dispensed with and a switch 66 closed.

Figures 3, 4:
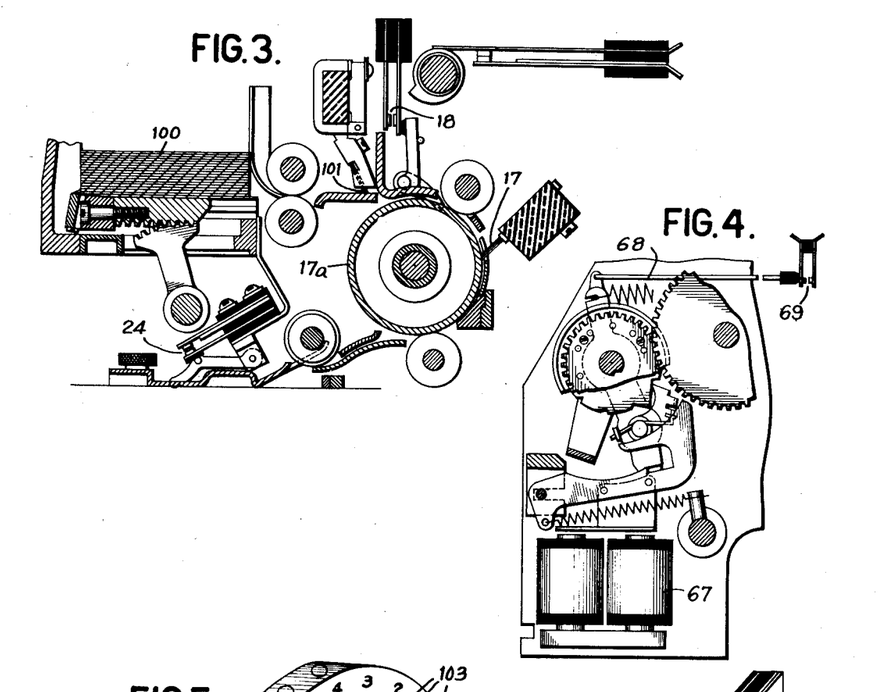
Fig. 3 is a cross sectional view of the card feeding and analyzing mechanism.
Fig. 4 is a detail of mechanism for adding an "elusive" one.

As shown, the switch 66 short circuits the brush 60 and will invariably cause energization of the inverting magnet 62 for each record card which in turn will cause energization of the punch inverting magnet 64 so that for each card the B amount will be inverted and the resulting sum will also be inverted. It will be apparent that where the record card is of the form B+CD and consequently has no X perforation in the column sensed by the brush 60 that the multiplying cycle initiating circuits are not interrupted by the contacts S1 and 62b and multiplying will follow immediately after the LH reset cycle in accordance with the diagram of Fig. 6. In Fig. 4 is shown the elusive one entry controlling magnet 67, which, upon energization, trips the carry mechanism associated with the units order of the LH accumulator and will cause the entry of one therein. Associated with the carry mechanism of the highest order of the LH accumulator is a rod 68 which is shifted toward the right whenever this highest order passes from nine to zero. This passage indicates that the amount in the accumulator is changing from a complementary value to a true number and this movement of the rod will cause closure of contacts 69. The contacts are shown in Fig. 1c and upon their closure will complete a circuit to energize the relay magnet Y and also the elusive one magnet 67 in parallel therewith. The magnet Y, upon energization, also opens its contacts Y1 in the holding circuit of the punch inverting magnet 64 and this magnet will accordingly be deenergized so that during the punching period, the contacts 64c will be in their normal position and the amount standing in the LH accumulator will be punched directly without inversion in accordance with Example II above.

In the solution of this problem, the RH reset cycle is not accompanied by card feeding and reading operations but occurs during an independent cycle. The card feeding is initiated by closure of contacts 90 (Fig. 1c) which complete a circuit from line 11, contacts 89 and N3, switches SP1, TP1, relay C to line 10. Relay C causes energization of card feed clutch magnet 14 as explained above to effect card feeding after the RH accumulator is reset, and a new term is entered into the RH accumulator.

When the machine is utilized as a standard multiplier and cross footing operations are not involved, the machine will sense the arithmetical signs of the factors and designate the product accordingly; that is, if the two factors are both positive or both negative, the product will be indicated as a positive product, and, if the signs of the factors are different, the product will be indicated as negative. For this purpose, two prereading brushes 70 and 71 are provided with associated relay coils 72 and 73. The brush 70 traverses a column of the card related to the multiplier. If their respective columns contain perforations, the relays will be energized through a circuit including contacts CA9, which are closed during the reading operations. The relays 72 and 73 control contacts 72a and 73a which are wired as shown. If neither of the relays is energized, no circuit can pass through the contacts, and also, if both relays are energized together, no circuit will be completed. If only one of the relays is energized, a circuit may be completed; for example, if only relay 73 were energized, which circuit is traceable from line 11 through so-called punch rack contacts 74, upper contact 73a, now closed, upper normally closed contact 72a, relay magnet Q, to line 10. The circuit also continues to switch 75 (closed to the right for this operation), contacts 76 closed by the punching mechanism upon completion of punching, relay magnet R, to line 10.

Relay magnet Q closes its contacts Q1 to provide a holding circuit from line 10, magnet Q, contacts Q1, contacts 74 to line 11. The magnet R closes its contacts R1 to provide a holding circuit from line 10, magnet R, contacts R1, normally closed contacts K1, to line 11.

In Fig. 1b are shown two plug sockets 77 and 78, the latter of which is connected by a plug connection 73 to a plug socket 50 related to the card column in which the X perforation designating the negative product is to be effected. The plug 77 is connected through a plug connection 80 to a plug socket 51 of the LHRO in cases where the product sign designation is to be made in a column in which other punching is also to take place.

Upon arrival of the selected card column in punching position, a circuit is completed from the line 47, through the common strip 48, to the segment 49, socket 50, connection 79, socket 78, relay magnet T, to line 10, through wire 29. Magnet T closes its contacts T2 and since contacts R2 are also closed, due to energization of the controlling magnet R, a circuit will be completed from the socket 78 through contacts T2, R2, to the X punch selecting magnet 53 to effect perforation of the X position of the selected column. If a plug connection 80 is also made, the circuit from socket 78 will continue to contacts T1, socket 77, connection 80, socket 51, and thence through the appropriate punch selecting magnet 53 according to the value standing on the selected order of the LHRO device.

It will thus be apparent that where factors having a negative sign are indicated by the presence of an X perforation and positive factors are indicated by the absence of a perforation in the same position, the resulting product, if negative, will be indicated by an X perforation in a predetermined location, and a positive product will be indicated by the absence of such perforation.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefor to be limited only as indicated by the scope of the following claims.

What is claimed is as follows:

1. In a multiplying machine having means for sensing a record for factor representations, multiplying said factors and entering the product back on the record; means for sensing the record for designations representing the arithmetic signs of said factors, means for designating the arithmetic sign of the product and means controlled by said factor sign sensing means for controlling the operation of said product sign designating means.

2. In a multiplying machine having means for sensing a record for factor representing perforations, multiplying said factors and punching the product back on the record; means for sensing a predetermined position in the record for each factor in which positions the presence of a perforation is indicative of one arithmetic sign and the absence thereof is indicative of another sign, means for punching in a further predetermined position to represent an arithmetic sign of the product and means controlled by said factor sign sensing means for controlling the operation of said punching means.

3. In a multiplying machine, means for sensing two arithmetic sign designating positions of a record related to two factors to be multiplied, in each of which positions a perforation represents a negative factor and the absence of a perforation represents a positive factor, means for punching in another position to designate the sign of the product and means controlled by said sensing means when only one of said factors has a negative sign representing perforation for causing the operation of said punching means to effect a perforation representing a negative product.

4. The invention set forth in claim 3 in which means is provided for preventing the operation of said punching means when a negative sign representing perforation is sensed in each of said two positions.

5. In a multiplying machine, means for sensing two arithmetic sign designating positions of a record related to two factors to be multiplied, in each of which positions a perforation represents one arithmetic sign and the absence of a perforation represents the other sign, means for punching in another position to designate the sign of the product and means controlled by said sensing means when only one of the factors has the sign represented by a perforation for causing the operation of said punching means to effect a perforation representing the sign of the product.

6. The invention set forth in claim 5 in which means is provided for preventing the operation of said punching means when like signs are represented in the two positions sensed.

7. In a multiplying machine, means for indicating the arithmetic sign of the product of a multiplication, a pair of relays, means for effecting separate settings of said relays representative of the arithmetic signs of the factors of a multiplication and means controlled by said relays for controlling the operation of said product sign indicating means.

8. In a multiplying machine, means for sensing a record card for three amounts, means for receiving the sensed amounts, an accumulator, means for entering one of said amounts into said accumulator in the form of a nines complement, means for multiplying the other two factors and entering the partial products thereof into said accumulator, whereupon the result will be either a nines complement of the true result or a true number one less than the true result, punching mechanism, and means controlled by said accumulator and including converting mechanism for automatically controlling said punching mechanism in accordance with the true result.

RUSSELL A. ROWLEY.